US012494095B2

(12) United States Patent
Chau et al.

(10) Patent No.: US 12,494,095 B2
(45) Date of Patent: Dec. 9, 2025

(54) METHOD AND DEVICE FOR THE COMPUTER-SUPPORTED MONITORING OF THE OPERATION OF A VEHICLE SERVICE

(71) Applicant: Bayerische Motoren Werke Aktiengesellschaft, Munich (DE)

(72) Inventors: Le Bao Huy Chau, Munich (DE); Marco Bross, Sao Paulo (BR)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 726 days.

(21) Appl. No.: 17/781,353

(22) PCT Filed: Dec. 10, 2020

(86) PCT No.: PCT/EP2020/085468
§ 371 (c)(1),
(2) Date: May 31, 2022

(87) PCT Pub. No.: WO2021/164918
PCT Pub. Date: Aug. 26, 2021

(65) Prior Publication Data

US 2022/0415101 A1 Dec. 29, 2022

(30) Foreign Application Priority Data

Feb. 17, 2020 (DE) ..................... 10 2020 104 059.8

(51) Int. Cl.
*G07C 5/08* (2006.01)

(52) U.S. Cl.
CPC .................................. *G07C 5/0808* (2013.01)

(58) Field of Classification Search
None
See application file for complete search history.

(56) References Cited

U.S. PATENT DOCUMENTS

2005/0055619 A1* 3/2005 Bedwani ............... G06F 11/277 714/752
2017/0178419 A1* 6/2017 Paridel .................... G06F 30/20
(Continued)

FOREIGN PATENT DOCUMENTS

CN 106774287 A 5/2017
CN 108965044 A 12/2018
(Continued)

OTHER PUBLICATIONS

International Search Report corresponding to International Patent Application No. PCT/EP2020/085468, dated Apr. 26, 2021 (4 pages).
(Continued)

*Primary Examiner* — Donald J Wallace
*Assistant Examiner* — Paysun Wu
(74) *Attorney, Agent, or Firm* — Maginot, Moore & Beck LLP

(57) ABSTRACT

A method for the computer-supported monitoring of the operation of a vehicle service includes providing in a test environment, a telematics control device of the vehicle type for which the vehicle service is intended to be monitored. The methods also includes simulating the vehicle using a first simulation unit generating test data and making the test data available to the telematics control device as status data on a vehicle bus. The method further includes simulating the data sink using a second simulation unit, wherein the simulated data sink is assigned to the simulated vehicle via a unique test vehicle identifier, at least in part by retrieving the status data stored for the simulated vehicle from the central computing system. The test data generated by the first simulation unit and the status data retrieved by the second simulation unit are evaluated at least in part using a comparison.

20 Claims, 2 Drawing Sheets

(56) References Cited

U.S. PATENT DOCUMENTS

| | | | | |
|---|---|---|---|---|
| 2018/0050704 A1* | 2/2018 | Tascione | .............. | G07C 5/0808 |
| 2019/0146486 A1* | 5/2019 | Doster | ................... | G06Q 10/04 701/29.3 |
| 2020/0238970 A1* | 7/2020 | Ghanbari Milani | .. | G01M 15/02 |

FOREIGN PATENT DOCUMENTS

| | | | |
|---|---|---|---|
| CN | 109240621 | A | 1/2019 |
| DE | 102016109651 | A1 | 12/2016 |
| DE | 102018212560 | A1 | 2/2019 |

OTHER PUBLICATIONS

Chinese Office Action corresponding to Chinese Patent Application No. 202080081029.0, dated Sep. 30, 2024 (7 pages).

English Translation of Chinese Office Action corresponding to Chinese Patent Application No. 202080081029.0, dated Sep. 30, 2024 (8 pages).

English Translation of CN108965044A. (7 Pages).

* cited by examiner

DBT

SD

| TS | VIN | SZ1 | ... | SZn | FM |
|---|---|---|---|---|---|
| dd.mm.yy hh:mm:ss | E43P23T | CL | | OP | Zero |
| dd.mm.yy hh:mm:ss | WA134P3 | CL | | CL | FM1 |
| dd.mm.yy hh:mm:ss | Q19X39D3 | CL | | CL | FM2 |
| dd.mm.yy hh:mm:ss | R36O789 | OP | | OP | Zero |
| dd.mm.yy hh:mm:ss | S23J2K4 | CL | | OP | FM2 |

Fig. 3

TRT

| TS | VIN | TD (SZi) | SD (SZi) | CONS | FM | FTP |
|---|---|---|---|---|---|---|
| dd.mm.yy hh:mm:ss | Q19X39D3 | | | y | Zero | |
| dd.mm.yy hh:mm:ss | Q19X39D3 | | | n | FM1 | 1 |
| dd.mm.yy hh:mm:ss | Q19X39D3 | | | n | FM2 | 2 |
| dd.mm.yy hh:mm:ss | Q19X39D3 | | | n | FM2 | 2 |

METHOD AND DEVICE FOR THE COMPUTER-SUPPORTED MONITORING OF THE OPERATION OF A VEHICLE SERVICE

The present application is the U.S. national phase of PCT Application PCT/EP2020/085468 filed on Dec. 10, 2020, which claims priority of German patent application No. 102020104059.8 filed on Feb. 17, 2020, which is incorporated herein by reference in its entirety.

TECHNICAL FIELD

The disclosure relates to a method and a device for the computer-supported monitoring of the operation of a vehicle service.

BACKGROUND

A vehicle service comprises interaction between the vehicle, a central computing system and a data sink assigned to the vehicle via a unique vehicle identifier. The interaction is such that status data relating to the vehicle are transmitted from a telematics control device inside the vehicle to the central computing system on account of a change and otherwise at cyclical intervals of time and the status data transmitted last are stored by the central computing system for subsequent retrieval and processing by the data sink. The status data can then be visualized and/or stored and/or processed, for example, on the data sink.

Such vehicle services are developed for respectively different types of vehicles, wherein known hardware and software components in the vehicle, the central computing system and the data sink are taken as a basis during development. Any change in the hardware and/or software components in comparison with this starting state, for example hardware or software changes in the central computing system, other types of data sinks or changes in the software versions of the programs running on the data sinks, may disrupt the stable operation of the vehicle service in terms of the interaction. Since there are continuous functional enhancements of the data sinks as part of digitization, for example by virtue of adaptations in the central computing system or mobile radio components, hitherto unknown fault sources may possibly arise as a result of the new combinations of hardware and software. It is therefore necessary to validate and monitor the interaction between the various components which make it possible to provide the vehicle service.

In particular, it is necessary to identify faults which possibly occur as quickly as possible so that the number of customers affected by a fault can be kept as low as possible. Faults are typically first identified by corresponding customer complaints, but this allows targeted analysis and fault rectification only to a limited extent since log files which make it possible to analyze the problem are available only for the central computing system. For example, vehicle problems cannot be efficiently analyzed.

The object of the disclosure is to specify a method and a device for the computer-supported monitoring of the operation of a vehicle service, which are functionally improved and, in particular, make it possible to quickly identify possible faults on account of changes in the vehicle service. In particular, the intention is to make it possible to be able to narrow down the location or trigger of a fault more accurately.

SUMMARY

These objects are achieved by means of a method and a device having features described herein.

A first aspect proposes a method for the computer-supported monitoring of the operation of a vehicle service comprising interaction between the vehicle, a central computing system and a data sink assigned to the vehicle via a unique vehicle identifier. The unique vehicle identifier is for example and preferably the vehicle identification number (VIN), but may also be another unique identifier. As part of the interaction, status data relating to the vehicle are transmitted from a telematics control device inside the vehicle to the central computing system on account of a change and otherwise at cyclical intervals of time and the status data transmitted last are stored by the central computing system for subsequent retrieval and processing by the data sink. The processing by the data sink comprises visualization of the status data, for example. The data sink may be, for example, a user terminal or a (service) database or a computer or computing system.

In order to perform the computer-supported monitoring of the operation of the vehicle service, in a test environment, a telematics control device of a type of the vehicle or of a particular vehicle type, for which the vehicle service is intended to be monitored, is provided in a step a). The telematics control device is therefore a "real" telematics control device, as is installed in a particular vehicle or vehicle type. Step a) is a step of the method that is to be carried out once or is a preparatory step.

In a step b), the vehicle is simulated by means of a first simulation unit by virtue of the first simulation unit generating test data and making them available to the telematics control device as the status data on a vehicle bus. In terms of its topology and the message transmission scheme (protocol) used, the vehicle bus corresponds to the vehicle bus installed in a real vehicle. Since the telematics control device operates as intended as if it were installed in a real vehicle, the telematics control device transmits the status data, for example, to the central computing system either on account of a change, a transmission trigger determined in another manner or at cyclical intervals of time, which central computing system then provides the status data for retrieval by the data sink.

In a step c), the data sink is simulated by means of a second simulation unit by virtue of the status data stored for the simulated vehicle being retrieved from the central computing system. Retrieval is effected according to the message protocol used in reality. If the present description refers to retrieval of the status data stored in the central computing system, this generally comprises a request message which is transmitted from the data sink to the central computing system and is used by the data sink to request status data. In order to respond to the request message, the central computing system transmits a response message containing the requested status data. These data can then be processed as intended by the data sink, in particular visualized for a user. In this case, the data sink simulated by means of the second simulation unit is assigned to the vehicle simulated by means of the first simulation unit via a unique test vehicle identifier. The test vehicle identifier corresponds to a real vehicle identifier (VIN) in terms of structure and nomenclature.

In a step d), the test data generated by the first simulation unit and the status data retrieved by the second simulation unit are evaluated by means of a comparison.

The proposed method is therefore based on a stationary system which simulates the functions of a real vehicle in interaction with the central computing system which is used for real-time operation and is typically referred to as the backend in the field of vehicles. A real telematics control device is used to realistically simulate a vehicle or a vehicle type, wherein all necessary input variables are made available to the telematics control device in a conventional form via the first simulation unit. Since the first simulation unit generates the test data, it is possible to cover a large event space, such that it is possible to determine the discovery of faults, whether on account of hardware defects, faulty transmission paths or incorrectly operating software components, both on the part of the central computing system and on the part of the data sink. The method therefore makes it possible to implement a hardware-in-the-loop (HIL) test bench which can be used, for example following changes made in the hardware or software of any desired components, to test the functionality.

Since the test data pass through the communication connections used in real operation and are stored as status data in the central computing system (wherein the central computing system cannot identify that the status data are test data relating to the merely simulated vehicle), respective technical subsystems which are actually operating and are also used by customers are run through. The status data comprising the test data are then retrieved via the interface of the data sink, which corresponds to the actual customer interface, and are compared with the test data generated by the first simulation device. In this case, it is possible to tap off the status data at a plurality of measurement points, as a result of which a fault location can be narrowed down in the event of a fault. In addition, it is possible to analyze specific fault times and therefore the effect of faults in order to infer certain disruptions which are dependent on the time of day and may arise, for example, on account of excessive utilization of the central computing system.

One expedient configuration provides for the performance of steps b) and c) to form a test run. The evaluation is preferably carried out by means of a comparison in step d) after a multiplicity of test runs. Associated transmitted test data and status data retrieved by the data sink may be located, for example, on the basis of a time stamp or steps b) and c) which succeed one another in pairs.

It is also expedient if only the test runs in which the comparison of the test data with the retrieved status data of a respective test run has a difference are processed in the evaluation. A difference is present, for example, when a status condition of a particular data source in the test data does not correspond to the status condition of the corresponding data source in the status data.

It is also expedient if the location or the faulty component causing the fault is inferred from the frequency of a fault type when evaluating the test runs having a difference.

The test data comprise a respective status condition of a set of data sources, in particular vehicle sensors, for example flap sensors (such as door(s), trunk, engine cover, sliding roof etc.), window sensors, tire pressure sensors, filling level sensors (such as tank, engine oil, state of charge of a traction battery, battery voltage of a traction battery etc.), fault memory entries and the like. The specific data sources included in a set of data sources depend substantially on the functionality provided by the vehicle service and the sensors installed in a respective vehicle. A vehicle service may comprise all of the data sources mentioned, or any desired partial selection of the data sources mentioned.

According to a further expedient configuration, the test data, in particular a respective status condition of the set of data sources, are randomly generated by the first simulation unit. If the data source is a flap sensor, for example, an item of condition information, for example "open" or "closed", or an item of digital information corresponding thereto ("1" or "0" or "H" or "L") is transmitted. Filling level information is transmitted in numerical form, for example remaining tank contents. With each test run, the test data, and therefore a respective status condition of the set of data sources, are randomly newly generated by the first simulation unit.

It is also expedient if the test data are cyclically generated and are made available to the telematics control device as the status data, which telematics control device then transmits them directly to the central computing system for storage. The cyclical generation may be oriented, for example, to the cycle of transmitting status data to the central computing system or may differ therefrom.

It is also expedient if the test data are stored as the status data, together with a time stamp and the test vehicle identifier (as a conventional vehicle identifier), in a database of the central computing system, wherein the status data, the time stamp and the test vehicle identifier form a test data set. The test data set in the database may optionally comprise a fault message which indicates whether and which fault has been determined during the processing inside the central computing system. This makes it easier, for example in the case of a multiplicity of test runs, to infer the location or the component causing the fault from the frequency of a fault type or a fault message, in particular within the central computing system.

A further expedient configuration provides for the test data generated by the first simulation unit and the status data retrieved by the second simulation unit to be written in an assigned (for example associated) form to a common test run table in a database. If the present description refers to retrieved status data, this should be understood as meaning the retrieval of the entire test data set comprising the status data. Although it would be sufficient to compare merely the test data and the retrieved status data in order to determine the fault, the information additionally included in the test data set makes it easier to infer the fault time and/or the fault location.

A further expedient configuration provides for the first simulation unit to transmit the status data to the central computing system via a wireless communication connection. The components of the telematics control device, which transmits the data to the central computing system via a mobile radio connection, for example 3G, 4G (UMTS), 5G and the like, are used for this purpose. The conventionally provided mobile radio interface is therefore used here.

It is expedient if the second simulation unit retrieves the status data from the central computing system via a wireless or wired communication connection. The wireless communication connection may correspond, for example, to a corresponding mobile radio connection, as would be used by a user. However, since the second simulation unit may also be connected to the central computing system via a network connection, retrieval is also possible in this manner.

A second aspect proposes a device for the computer-supported monitoring of the operation of a vehicle service that is designed as described above. The device comprises a telematics control device of a type of the vehicle or of a vehicle type, for which the vehicle service is intended to be monitored, and a test computing unit which is designed to carry out the method in accordance with one or more embodiments as described herein. The device has the same advantages as those described above in connection with the method of the first aspect.

A further aspect proposes a computer program product having program code, which is stored on a non-volatile, machine-readable carrier, for carrying out a method according to one or more embodiments of the present disclosure.

BRIEF DESCRIPTION OF THE DRAWINGS

The features and advantages will become more readily apparent on the basis of the following description, and an exemplary embodiment in the drawing, in which:

FIG. 3 shows a test run table TRT which is processed for the purpose of evaluating and monitoring the operation of the vehicle service:

DETAILED DESCRIPTION

Figures 1, 2:
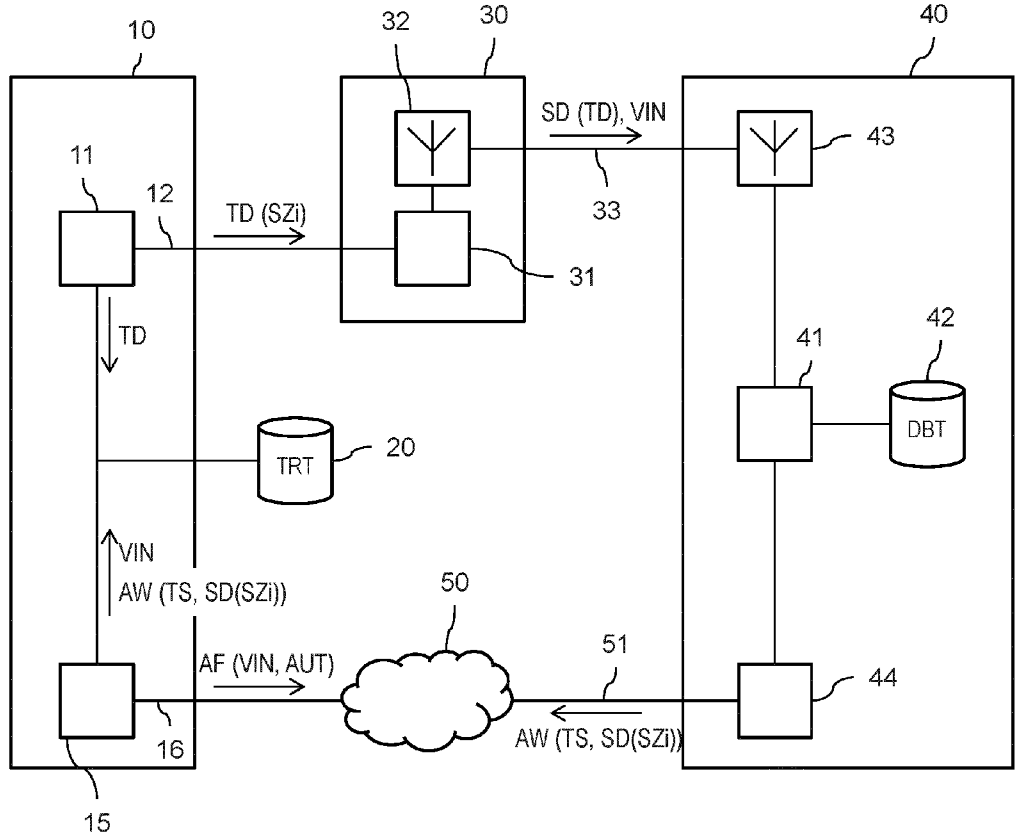
FIG. 1 shows a schematic illustration of a device according to the invention for the computer-supported monitoring of the operation of a vehicle service.
FIG. 2 shows a database table DBT which is provided in a central computing system and comprises status data stored last for a respective vehicle.

The device for the computer-supported monitoring of the operation of a vehicle service is a stationary system which simulates the functions of a real vehicle in interaction with a central computing system 40 in a test environment. The vehicle service comprises interaction between a vehicle, the central computing system 40 and a data sink uniquely assigned to the vehicle, for example a user terminal (cell phone or mobile device), a database or a computer or computer system. In the following description, reference is made to a user terminal as a data sink for the sake of simplicity, without restricting generality.

The functions of the vehicle are implemented in the test environment by means of a first simulation unit 11, which is executed on a test computing unit 10, and a real telematics control device 30 coupled to the test computing unit 10. In this case, the telematics control device 30 is of a type of the vehicle or of a vehicle type, for which the vehicle service is intended to be monitored. In other words, the telematics control device is a real telematics control device 30, as is installed in a particular vehicle type.

The functions of the user terminal, for example a smartphone, are simulated by means of a second simulation unit 15 which is likewise executed, for example, on the test computing unit 10. However, the first and second simulation units 11, 15 could also be in the form of test computing units which are separate from one another and are then configured to interchange data.

The first simulation unit simulating the vehicle is designed to generate test data TD and to make them available to the telematics control device 30 on a vehicle bus 12. The test data TD comprise a respective status condition SZi of a set of data sources i (i=1 . . . n), wherein the n data sources may be any desired vehicle sensors, in particular comprise flap sensors (for example of the door(s), of the trunk, of the engine cover, of the sliding roof, etc.), window sensors, tire pressure sensors, filling level sensors (for example of a tank, an engine oil container, a traction battery), fault memory entries and the like. The status condition of a flap sensor comprises, for example, an item of binary information, for example "open" or "closed" (or the digital equivalents thereof "1" or "0" or logic "H" or logic "L"). Tire pressure sensors and filling level sensors indicate, as numerical values, an item of pressure information relating to a respective tire, a filling level of a tank, an engine oil volume, an energy content of a traction battery and the like, for example.

Fault memory entries comprise fault codes, for example, which may be in any desired notation. The test data TD, in particular a respective status condition SZi of the set of data sources, are randomly generated by the first simulation unit 11.

The vehicle bus 12 is connected to a computing unit 31 of the telematics control device 30. In terms of its topology and the message transmission scheme (protocol) used, the vehicle bus 12 corresponds to the vehicle bus installed in the real vehicle which is simulated here. The test data TD comprising a respective status condition SZi of a set of data sources are interpreted as status data SD by the computing unit 31 of the telematics control device 30. The computing unit 31 is designed to receive the test data applied to the vehicle bus 12 and to transmit them as the status data SD, which correspond to the test data TD, to the central computing system 40 via a transmitting/receiving unit 32 of the telematics control device 30 by means of a wireless communication connection 33. The wireless communication connection 33 is based on the technology used by the telematics control device 30, for example a mobile radio network according to 4G or 5G.

The status data SD are transmitted from the telematics control device 30 to the central computing system 40 together with the unique test vehicle identifier VIN (which corresponds to a conventional vehicle identifier in terms of its notation) and are received there by a transmitting/receiving unit 43 of the central computing system 40.

The central computing system 40, which constitutes a backend of the vehicle manufacturer, also comprises a computing unit 41 and a database 42. The computing unit is designed to receive the data (status data SD together with the test vehicle identifier VIN) received at the transmitting/receiving unit 43, to process said data and to store them as a test data set in the database 42. In this case, the test data set comprising the status data SD, the test vehicle identifier VIN and a time stamp TS is stored in a database table DBT. The test data set differs from a real data set of an actual vehicle only in the fact that the test vehicle identifier VIN is included as the vehicle identifier or the test data set can be distinguished from data sets of real customers on the basis of another identification.

A part of a database table DBT having a test data set (discernible from the exemplary test vehicle identifier "Q19X39D3" in the column VIN) and a plurality of data sets of a real vehicle (discernible from the exemplary vehicle identifiers "R36O789", "E43P23T", "S23J2K4" and "WA134P3" in the column VIN) is illustrated by way of example in FIG. 2. In reality, the database table comprises a data set, that is to say a row entry, for each vehicle corresponding to the type of simulated vehicle. In this case, the data set comprising the currently valid status data SD (that is to say received last from the central computing system 40) is included for each vehicle, that is to say for a respective vehicle identifier.

The database table DBT comprises, for example, a column for the time stamp TS (which indicates the time at which the status data SD are generated or transmitted or received, for example in the format day:month:year hour:minute:second), a column for the vehicle identifier VIN, a number n of columns for the status conditions SZi of the n data sources (which together represent the status data SD) and an (optional) column for a fault message FM (where "zero" represents no fault and "FM1" or "FM2" represents a particular fault). Each row entry corresponds to a data set or test data set. Not only the test data set which is of interest for the present method and is generated by the operation of the device according to the invention, but also all data sets which generate status data SD using real vehicles of a vehicle manufacturer, are therefore stored in the database table DBT. Since respective test data sets comprise the same test vehicle identifier VIN for the computer-supported monitoring of the operation of the vehicle service, these may be extracted gradually (for example after each transmission by the telematics control device 30) from the database table DBT in a simple manner for further analysis.

From the point of view of the central computing system 40, the test computing unit 10, which executes the first and second simulation units 11, 15, ultimately does not behave any differently to a real vehicle or a real user terminal.

For example, the central computing system 40 has a further transmitting/receiving unit 44 which may be of a wireless or wired nature for communication with the second simulation unit 15. Optionally, only a single transmitting/receiving unit 43 may also be provided for the purpose of implementing the method according to the invention. In the present exemplary embodiment, the status data SD or the complete test data set can be retrieved by the second simulation unit 15 simulating the user terminal via the transmitting/receiving unit 44.

The communication connection between the second simulation unit 15 and the transmitting/receiving unit 44 may be of any desired type. In the present exemplary embodiment, it is assumed that the communication between the second simulation unit 15 and the transmitting/receiving unit 44 takes place via a wired or wireless network connection 16, any desired network 50 and a wireless or wired communication connection 51.

In order to retrieve the status data SD stored in the database table DBT for the simulated vehicle, the second simulation device 15 transmits a request message AF to the central computing system 40. The request message AF includes, for example, the unique test vehicle identifier VIN and an authentication AUT. The information included in the request message AF is received by the transmitting/receiving unit 44, processed by the computing unit 41 and, in the event of positive authentication, a response message AW is transmitted from the central computing system 40 to the second simulation unit 15. The response unit AW includes at least the status data SD, which comprise a respective status condition SZi of the set of data sources, and the time stamp TS. As explained, the information from a fault message FM can also be transmitted.

The random generation of test data TD, the transmission to the central computing system 40 and the retrieval by the second simulation unit 15 constitute a test run which is preferably repeated at cyclical or irregular intervals of time, with the result that a multiplicity of data items are available for evaluation.

The determination of whether or not the vehicle service is operating as intended is carried out by means of a comparative evaluation of the test data TD generated by the first simulation unit 11 and the status data SD retrieved by the second simulation unit 15. For this purpose, the test computing unit 10 has a database 20 or is connected to an external database 20. The test data TD generated by the first simulation unit 11 and the retrieved status data SD of this test run are stored in the database 20 in a test run table TRT of the database 20. This is illustrated, for example, in FIG. 3.

The test run table TRT comprises, for each test run which comprises the generation and transmission of test data TD and the retrieval of the corresponding status data SD, the generated time stamp TS, the vehicle identifier in the form of the test vehicle identifier VIN, the test data TD (comprising a respective switching condition SZi of the set of data sources), the retrieved status data SD (comprising the respective status conditions SZi of the corresponding set of data sources), a column CONS comprising an item of information relating to the correspondence between transmitted and received data, the column FM for the fault message possibly generated by the central computing system 40 and a column FTP for a fault type which can be determined from the fault message and/or test data TD and status data SD which possibly do not correspond. Each row in the test run table TRT comprises the data of a test run. The data of four test runs are illustrated in the present example, but several hundred or thousand test runs are included in the test run table in practice for evaluation.

Whereas the database table DBT (FIG. 2) therefore includes test data sets and data sets of real vehicles, the test run table TRT includes only test data sets, that is to say data sets with the unique test vehicle identifier, "Q19X39D3" in the present exemplary embodiment.

In the test run table TRT, the information included in the columns CONS and FTP is already of an evaluating nature. The column CONS indicates whether there is correspondence between the transmitted data TD and the received status data SD. In the exemplary embodiment, this is the case only for the data set in the first row with CONS="y". In a manner corresponding to this, no fault has been determined by the central database system either, with the result that the value "zero" is included as the fault message FM. In contrast, the data sets in rows 2 to 4 have a discrepancy between the test data and the status data SD, which is why the value "n" is respectively included in the column CONS. In all cases, the central computing system 40, for example, identified a fault during processing in the central computing system 40, wherein a respective cause of a fault was indicated by the fault FM="FM1" or "FM2". A fault type FTP, for example "1" in the fault message "FM1" and "FM2" in the fault message FM2, can be determined from the fault message.

In order to determine the intended functionality of the vehicle service, the test data TD are preferably generated cyclically and made available to the telematics control device 30 as the status data SD for further processing as described above. The generation of respective test data TD consequently results in a test data set which, together with the status data SD, results in a row entry in the test run table TRT. The method is preferably operated around the clock. In the case of a multiplicity of test data sets, it is possible to determine, for example, whether a particular fault type FTP occurs frequently. The fault type can be used to determine, for example, the point in the central computing system 40 at which a fault has occurred.

If there is no fault in the central computing system, but a lack of correspondence between transmitted test data and retrieved status data SD can nevertheless be determined, overloading of the wireless communication connection 33 or of the communication connection used by the second simulation unit 15 to retrieve the status data SD can be inferred, for example in the case of frequent occurrence at a particular time of the day.

If a fault cannot be unambiguously located locally, it would also be possible to resort to log files stored in the central computing system in order to determine whether the fault occurred before reception or after reception by the transmitting/receiving unit 43. As a result, a specific statement can be made on the availability, reliability, response times and content-related correctness of the vehicle service.

The computer-supported monitoring of the operation of the vehicle service is based on a hardware-in-the-loop system, which uses a real telematics control device of a type of the vehicle or of a vehicle type, and the processing by the central computing system which is also used for productive operation. Only the vehicle and the data sink are simulated by means of simulation units in one or more test computing units.

As a result of the cyclical generation of random data in the vehicle, the test data are sent to the central computing system via a real wireless communication connection. The generated test data processed as status data can then be tapped off at defined points and compared with the generated or transmitted test data. The central computing system is accessed via the real interfaces which are also used by customers of the vehicle to access the central computing system 40.

LIST OF REFERENCE SIGNS

10 Test computing unit
11 First simulation unit for simulating a set of vehicle data sources
12 Vehicle bus
15 Second simulation unit for simulating a data sink
16 Network connection (wired or wireless)
20 Database
30 Telematics control device
31 Computing unit
32 Transmitting/receiving unit (antenna, amplifier)
33 Wireless communication connection
40 Central computing system (backend)
41 Computing unit
42 Database
43 Transmitting/receiving unit (antenna, amplifier)
44 Transmitting/receiving unit (antenna or connection, amplifier)
50 Network
51 Wireless or wired communication connection
SD Status data
VIN Unique test vehicle identifier (vehicle identification number)
TD Test data
DBT Database table
TS Time stamp
SZi Status condition of the ith data source (i=1 . . . n, where n≥1)
FM Fault message
TRT Test run table
CONS Correspondence between transmitted and received data
FTP Fault type
AF Request message
AW Response message

The invention claimed is:

1. A method for computer-supported monitoring of operation of a vehicle service comprising interaction between a vehicle, a central computing system and a data sink assigned to the vehicle via a unique vehicle identifier, wherein the vehicle service operation includes transmitting vehicle status data relating to the vehicle from a telematics control device inside the vehicle to the central computing system responsive to a change, at cyclical intervals of time, or responsive to the change and at the cyclical intervals of time, and storing the vehicle status data transmitted last by the central computing system for subsequent retrieval and processing by the data sink, the method comprising:

a) providing in a test environment, the telematics control device, which is of a type of the vehicle or of a type of the vehicle type for which the vehicle service is intended to be monitored;

b) using a first simulation unit simulating the vehicle to generate test data and making the test data available to the telematics control device as status data on a vehicle bus;

c) simulating the data sink using a second simulation unit, wherein the simulated data sink is assigned to the simulated vehicle via a unique test vehicle identifier, at least in part by retrieving the status data stored for the simulated vehicle from the central computing system;

d) evaluating the test data generated by the first simulation unit and the status data retrieved by the second simulation unit at least in part using a comparison.

2. The method as claimed in claim 1, wherein the performance of steps b) and c) forms a test run, and wherein the evaluation of step d) is carried out using the comparison after a multiplicity of test runs.

3. The method as claimed in claim 2, wherein step d) further comprises processing only the test runs in which the comparison of the test data with the retrieved status data of a respective test run has a difference.

4. The method as claimed in claim 2, wherein step d) further comprises obtaining a frequency of a fault type for the multiplicity of test runs.

5. The method as claimed in claim 4, further comprising determining a location or a component causing the fault from the frequency of the fault type.

6. The method as claimed in claim 1, wherein the test data comprise a respective status condition of a set of data sources.

7. The method as claimed in claim 6, wherein the set of data sources include at least one of a group consisting of a flap sensor, a window sensor, a tire pressure sensor, a filling level sensor, and a fault memory entry.

8. The method as claimed in claim 1, wherein the test data are randomly generated by the first simulation unit.

9. The method as claimed in claim 1, wherein the test data are cyclically generated and are made available to the telematics control device as the status data.

10. The method as claimed in claim 1, wherein the test data are stored as the status data, together with a time stamp and the test vehicle identifier, in a database of the central computing system, wherein the status data, the time stamp and the test vehicle identifier form a test data set.

11. The method as claimed in claim 10, wherein the test data set in the database comprises a fault message which indicates whether and which fault has been determined during processing by the central computing system.

12. The method as claimed in claim 1, wherein the test data generated by the first simulation unit and the status data retrieved by the second simulation unit are written in an assigned form to a common test run table of a database.

13. The method as claimed in claim 1, wherein, the first simulation unit transmits the status data to the central computing system via a wireless communication connection.

14. The method as claimed in claim 13, wherein the second simulation unit retrieves the status data from the central computing system via a wireless or wired communication connection.

15. The method as claimed in claim 1, wherein the second simulation unit retrieves the status data from the central computing system via a wireless or wired communication connection.

16. The method as claimed in claim 1, further comprising, storing in a database operably coupled to the second simulation unit, the test data made available to the telematics control device as status data on the vehicle bus, the status data retrieved by the second simulation unit, and information relating to the correspondence between the test data made available and the status data retrieved.

17. The method as claim in claim 1, wherein step c) wherein:

the status data stored for the simulated vehicle retrieved by the central computing system was received by the central computing system via the telematics control device.

18. A device for computer-supported monitoring of operation of a vehicle service comprising interaction between a vehicle, a central computing system and a data sink assigned to the vehicle via a unique vehicle identifier, wherein the vehicle service operation includes transmitting vehicle status data relating to the vehicle from a telematics control device inside the vehicle to the central computing system responsive to a change, at cyclical intervals of time, or responsive to the change and at the cyclical intervals of time, and storing the vehicle status data transmitted last by the central computing system for subsequent retrieval and processing by the data sink, comprising:

the telematics control device, which is of a type of the vehicle or of a type of the vehicle type, for which the vehicle service is intended to be monitored; and a test computing unit which is designed to carry out the following steps, a) using a first simulation unit simulating the vehicle to generate test data and making the test data available to the telematics control device as status data on a vehicle bus;

b) simulating the data sink using a second simulation unit, wherein the simulated data sink is assigned to the simulated vehicle via a unique test vehicle identifier, at least in part by retrieving the status data stored for the simulated vehicle from the central computing system;

c) evaluating the test data generated by the first simulation unit and the status data retrieved by the second simulation unit at least in part using a comparison.

19. The device as claimed in claim 18, wherein the performance of steps a) and b) forms a test run, and wherein the evaluation of step c) is carried out using the comparison after a multiplicity of test runs.

20. A computer program product having program code, which is stored on a non-volatile, machine-readable medium, for carrying out a method as claimed in claim 1 when the program code is executed on a computer.

* * * * *